United States Patent [19]
Mulfinger et al.

[11] 3,801,356
[45] Apr. 2, 1974

[54] METHOD OF PRODUCING VITREOUS LAYERS ON SUBSTRATE MATERIALS

[76] Inventors: Hans-Otto Mulfinger, Alemannenstrasse 24, Ingelheim/Rhine; Hubert Dutz, Max-Planck-Strasse 18, Mainz-Gosenheim; Hans-Georg Krolla, Westring 285, Mainz-Mombach, all of Germany

[22] Filed: Sept. 16, 1971

[21] Appl. No.: 181,020

Related U.S. Application Data

[63] Continuation-in-part of Ser. No. 791,427, Jan. 15, 1969, abandoned.

[52] U.S. Cl. ......... 117/93.3, 117/106 A, 117/169 A, 65/33
[51] Int. Cl. ............................................. C23c 13/04
[58] Field of Search ............ 117/106, 125, 70, 93.3, 117/169 A; 65/33

[56] References Cited
UNITED STATES PATENTS

| | | | |
|---|---|---|---|
| 3,552,352 | 1/1971 | McConnell | 117/106 R |
| 3,421,916 | 1/1969 | Mikoda | 65/33 |
| 3,537,868 | 11/1970 | Kosaka | 65/33 |
| 3,647,490 | 3/1972 | Pirooz | 65/33 |
| 3,645,786 | 2/1972 | Tannenberger | 117/106 |

OTHER PUBLICATIONS

Moore, David; Electron Beam Technology, "Evaporation by Electron Bombardment," 1962, p. 387–388.

*Primary Examiner*—Ralph S. Kendall
*Assistant Examiner*—J. Massie
*Attorney, Agent, or Firm*—Hill, Sherman, Meroni, Gross & Simpson

[57] ABSTRACT

A method of producing vitreous layers on any type of substrate material in which an alkali-containing multi-component glass having at the most 10 percent by weight of alkali oxide is heated in an electron beam furnace to a glowing condition and then is subjected to the action of the electron beam which vaporizes the pre-heated glass and deposits it on the substrate material.

3 Claims, 1 Drawing Figure

PATENTED APR 2 1974
3,801,356
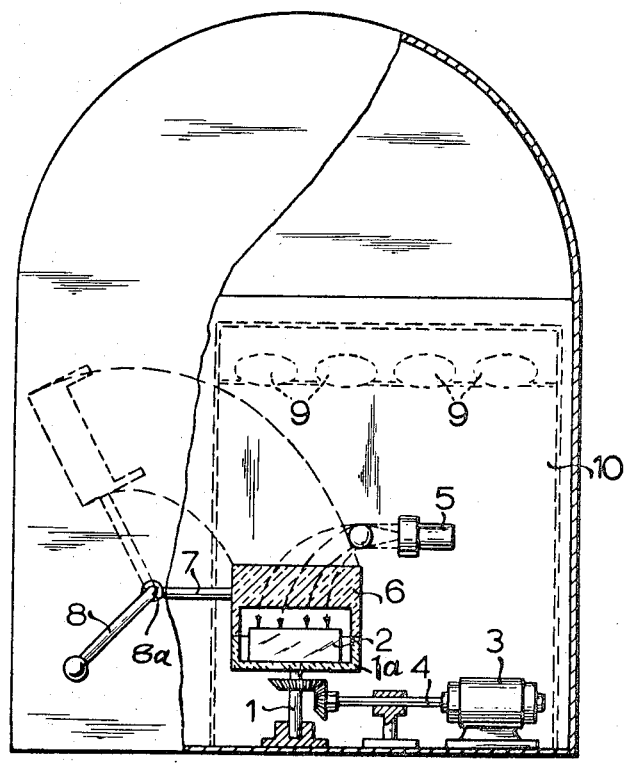
INVENTORS
Hans-Otto Mulfinger, Hubert Dutz & Hans-Georg Krolla
BY Singer, Stern & Carlberg
ATTORNEYS

METHOD OF PRODUCING VITREOUS LAYERS ON SUBSTRATE MATERIALS

The invention relates to a method of producing vitreous layers on any kind of substrate materials by means of electron beam furnaces in a high vacuum, and constitutes a continuation-in-part of application Ser. No. 791,427 filed on Jan. 15, 1969, now abandoned.

There are known several methods for vapor-depositing vitreous layers on substrates.

One of these prior methods consists in this, that highly oxidizable metals or metal alloys, as for instance lead-silicon, lead-tellurium, aluminum-silicon, in the form of an electrode are vaporized in an oxygen-argon gas atmosphere at a total pressure of approximately $2.5 \times 10^{-2}$ torr and are precipitated as oxide on the substrate. This method is limited to metals as starting material and also to the vaporization of solids as vapor depositing process. This known method requires further a relatively high partial pressure of oxygen of about $1.2 \times 10^{-2}$ torr and for this reason alone is not suitable for vapor depositing by means of electron beams which takes place at pressures of less than $10^{-4}$ torr. Nothing is stated about the quality of the films to be vapor-deposited. This method is limited to obtainable alloys; and it will not permit the introduction of network modifiers, such as lithium, sodium, potassium, etc., into the glass layer to be produced.

Another method is based on a plurality of metal oxides which are separately heated in a vessel and are vaporized at $10^{-5}$ torr. The disadvantage of this known method is that it is very difficult to obtain homogenous glasses from separately vaporized oxides.

It is further known to vapor deposit vitreous mono-component layers by means of electron beam furnaces in a high vacuum. Such layers which consist of quartz are, however, composed of a plurality of individual particles and are, therefore, not dense but cracked or fissured, so that their possibilities for use are limited.

The object of the invention is a method of producing vitreous coatings on any type of substrate materials by means of electron beam furnaces in a high vacuum, by which the coatings obtained are homogeneous, have no tendency to form fissures and are free from the further disadvantages of known methods.

This object is attained according to the invention in that an alkali-containing multi-component glass including at the most 10 percent by weight of an alkali oxide is to a high degree degassed in vacuo or is melted in a protective gas atmosphere, and is subsequently vaporized and precipitated on the substrate.

Depending upon the manufacturing conditions and the intended use, these layers or coatings may possess one or more of the following properties: They may be dense, hard, flexible, they may be either electrically non-conductive or semi-conductive, anti-static, hydrolytically stable, transparent, they may have a high or a low index of refraction, they may be colorless as well as colored, heat-insulating and they may have very great electric strength. For special purposes, a number of different multi-component glasses may be vapor-deposited superimposed in several layers.

The method of the invention thus opens up a multitude of new fields of application.

Care should be taken that the water content be kept as low as possible by insertion of dry raw materials. Furthermore, glass compositions inclined to give off larger amounts of oxygen are not well suited.

As a protective gas for the melting process may, for instance, be used dried air, nitrogen or rare gases.

As unfavorable have proven glasses which have a high percentage of constituents whose vapor pressure is much greater than the pressure in the recipient during treatment in vacuum. Therefore, according to the invention, the multi-component glasses are indeed to contain alkali, but not more than 10 percent by weight of alkali oxide.

As particularly advantageous has proven to be alkali-borosilicate glass whose boric acid content is not more than 25 percent by weight.

According to the invention, also partly crystallized, or dissociated multi-component glasses may be vaporized and precipitated. In this way, it is made possible to utilize glasses for the method which in other cases leads to disadvantageous crystallization or dissociation during a heat treatment.

It has been discovered that the method of the invention is particularly suitable for multi-component glasses which contain the following components either singly or combined:

Oxide of the first, second, third, fourth and fifth main group and oxides of the first, second, third, fourth, fifth, sixth, seventh and eighth sub-groups of the periodic system of the elements, particularly, however, those of lithium, sodium, potassium, barium, titanium, vanadium, niobium, tantalum, boron, aluminum, gallium, silicon, germanium and phosphorus.

According to another feature of the invention, a high melting but readily vaporizable alkaliborosilicate glass may be dissolved in a low-melting glass which, however, is difficult to vaporize, or it may be intimately mixed with it, and this solution or mixture, respectively, serves as a multi-component glass to be vaporized. In this manner, the number of suitable multi-component glasses coming into consideration with their special properties is considerably increased.

The multi-component glasses used in accordance with the method of the invention preferably have the following composition.

$SiO_2$ — 35 — 85 percent by weight
$B_2O_3$ — 5 — 25 percent by weight
$Li_2O$ — 0 — 5 percent by weight
$Na_2O$ — 0.5 — 10 percent by weight
$K_2O$ — 0.5 — 10 percent by weight
$Al_2O_3$ — 3 — 40 percent by weight
$CaO$ — 0 — 25 percent by weight
$BaO$ — 0 — 25 percent by weight
$TiO_2$ — 0 — 20 percent by weight
$V_2O_5$ — 0 — 50 percent by weight In order to obtain thick layers or layer packs, the invention proposes to vapor-deposit one or more multi-component glasses simultaneously or alternately on a selected substrate material.

Since by the use of electron beam furnaces the multi-component glass is rapidly heated to high temperatures and undergoes a heat shock, the thermal coefficeint of expansion should preferably be $< 40 \times 10^{-7}/°C$ in the range from 20° to 300°C.

In order to be able to use also multi-component glasses for the method of the invention, such multi-component glasses are heated by a heating device prior to commencement of vaporization to a temperature above the lower limit of the cooling temperature.

While the prior known vapor-deposited layers, particularly those having a crystalline structure, disclose more or less strong tensile stresses which may lead to the formation of fissures or cause a chipping off from the substrate already at layer thickness above 0.1 $\mu m$, the vitreous layers produced according to the invention are largely free from tensile stresses and, owing to their excellent adherence to conventional substrate material are stable, even at relatively great thicknesses. These properties also make it possible to impart a further firmness-increasing effect to the layers in that with a suitable selection of materials, the condensation of the vaporized glass is carried out in such manner that permanent compressive stresses are produced in the coating. This is particularly successful on bases having a good adhesive power, for instance glass surfaces, if a multi-component glass whose coefficient of thermal expansion before and/or after vaporization and condensation on the substrate is lower than that of the substrate material, is vaporized and precipitated on the substrate while its temperature is maintained higher than the normal working temperature. After cooling to normal temperature, tangential compressive stresses are produced in the condensated layer which effect an increase in the mechanical strength and the surface hardness of the substrate. The layer thickness for this purpose should be at least several $\mu m$. For the heretofore unsolved problem of obtaining an effective surface-hardening of glass or ceramic materials by means of vapor-deposited coatings without employing diffusion processes, the method according to the new method opens up new possibilities for a simple technical solution.

The compact structure of the layers obtained in accordance with the method of the invention, which layers have a volume factor very close to 1, imparts to them at the same time a high degree of protection against atmospheric and chemical influences which in most cases are already obtained at small layer thicknesses. In this manner, optical glasses or crystals for instance may be provided with optically satisfactory protective coatings. Also metal and plastic surfaces may be glazed according to the invention. The layers are further adapted to form a protective covering and shielding of mechanically sensitive surfaces, as for instance thin-film-switches or surface mirrors, and for sealing and insulating non-homogeneous surfaces, such as fiber-optical plates.

EXAMPLE 1

A mixture of 8,080 g $SiO_2$, 2,240 g boric acid, 232 g $Al_2O_3$, 628 g sodium carbonate, 150 g sodium chloride, 91 g potassium carbonate was melted in portions in a platinum crucible at temperatures between 1,550° and 1,600°C. The platinum crucible is placed in an evacuable and inductively heated furnace. The molten glass for clarification is heated to 1,620°C. Then a careful evacuation takes place until a pressure of less than 10 torr has been reached. This requires about twelve hours. Then the molten glass is poured into a mold and cooled in customary manner until it has become solid. Preferably the period of time required for evacuation is shortened by agitating the glass. The glass produced in this manner has the following composition:

$SiO_2$ — 82.3 percent by weight
$B_2O_3$ — 11.7 percent by weight
$Al_2O_3$ — 2.9 percent by weight
$Na_2O$ — 2.71 percent by weight
$K_2O$ — 0.4 percent by weight It has the following characteristics:
$\alpha = 29.0 \cdot 10^{-7}$ 1/°C
$Tg = 555$ °C
$VA = 1,412$ °C
Density = 2.20 g/cm³
Tk $b$.100 = 254 °C
hydrolytic Class 1
$n = 1.4679$
$\nu D = 65.41$ A pane or disc made of this glass is inserted in an electron beam furnace of conventional construction in such manner that it may be rotated during the vaporizing operation. The electron beam is deflected 180°, onto the surface of the pane of glass so that the glass may be vapor-deposited unhindered on the substrate. Before the electron beam is turned on, the pane of glass is heated to a glowing condition. When using this particular glass, the electron beam may immediately be fully turned on because the thermic stresses will not destroy the glass. The glass may be vapor-deposited on any type of substrate materials of desired shape. However, bodies with three-dimensional expansion must be rotated in two planes.

The vapor-deposited layer has the following characteristics: It is dense, transparent, flexible within a short radium, antistatic, fissure-proof, electrically insulating, thermically insulating, hydrolytically of very good stability.

EXAMPLE 2

A glass with the following composition:
$SiO_2$ — 80.90 percent by weight
$B_2O_3$ — 12.8 percent by weight
$Al_2O_3$ — 2.2 percent by weight
$Na_2O$ — 5 percent by weight
$K_2O$ — 0.6 percent by weight is ground in a porcelain mill with balls of procelain for as long a time until 91 percent < 10 $\mu$ and 46 percent < 5 $\mu$. 1,000 g of this powder are placed in a platinum crucible which is placed in an inductively heated vacuum furnace. The glass powder is heated for removal of the surface water to 580° C, and at the same time the pressure is decreased to 0.1 torr. At this temperature the glass is left for 4 hours. Thereafter, the temperature is increased to 700°–720° C. Simultaneously the pressure is lowered to 0.05 torr. This temperature is maintained for 20 hours. The result is that the water bound in the glass escapes. Subsequently the glass is heated in a short time to 1,100° C. This temperature is maintained for 2 hours. Now the glass is heated to 1,500° and left for 1 hour at this temperature. Thereafter the molten glass is poured into a mold and cooled as usual until it has become solid.

The glass produced in this manner has the following composition:
$SiO_2$ — 81.9 percent by weight
$B_2O_3$ — 13.0 percent by weight
$Al_2O_3$ — 5.1 percent by weight
$Na_2O$ — 2.0 percent by weight
$K_2O$ — 0.5 percent by weight Further characteristics:

$$\alpha = 29 \cdot 10^{-7} \text{ 1/°C}$$

The characteristics of this glass are to a far-going extent identical with those mentioned in respect of Example 1. Also the composition and the characteristics of the vapor-deposited layer show hardly any differences from that in respect of Example 1.

EXAMPLE 3

A batch of the composition
$SiO_2$ — 3,050 g
$B_2O_3$ (dehydrated) — 400 g
$Al_2O_3$ — 200 g
$Li_2CO_3$ — 100 g
$Na_2CO_3$ — 172 g
$CaCO_3$ — 71 g
$BaCO_3$ — 181 g
LiF — 70 g is placed in a platinum crucible in an electrically heated furnace at a temperature of 1,500°. After the melting of the batch, the temperature is increased within 2 hours to 1,650°. For clarification the molten glass is left at this temperature for 10 hours. Thereafter, the temperature is lowered to 1,500° in ½ hour and then the molten glass is poured into a mold and cooled as usual until it has become solid. During the introduction-and melting-process, the furnace is flushed with highly dried air.

On account of the low content of alkali oxide and the low water content obtained by this method, the glass shows excellent vaporization characteristics.

EXAMPLE 4

A batch of the composition
$SiO_2$ — 4,610 g
$B_2O_3$ — (anhydrous) 1,500 g
$Al_2O_3$ — 1,160 g
$BaCO_3$ — 1,600 g
$CaCO_3$ — 3,160 g
$Na_2CO_3$ — 516 g
LiF — 176 g is placed in a platinum crucible and heated in an electrically heated furnace of the ordinary construction at 1,450° C and melted, while the furnace is flushed with highly dried air. The temperature is then increased to 1,500° and in the meantime the molten glass is agitated to hasten the clarification. The temperature is left for 3 hours at 1,500° while the flushing is continued. Thereafter the temperature is lowered during agitation to 1,400° and the molten glass is poured into a mold and cooled as usual until solidification.

The vaporization characteristics of this glass are very good on account of the low content of alkali oxide and the low water content of the smelting method utilized.

EXAMPLE 5

A batch of the following composition:
$SiO_2$ — 7,330 g
$B_2O_3$ (anhydrous) — 1,810 g
$Al_2O_3$ — 775 g
$Na_2O$ — 143 g is melted in a platinum-iridium-crucible in an electrically heated furnace at 1,550° C. while the furnace is flushed with highly dried air. After the melting, the temperature is increased in 2 hours to 1,700° C. For the clarification, the temperature is left for 8 hours. After this, the temperature is lowered during continuous flushing with dry air to 1,600° and the molten glass is poured into a mold and cooled as usual until it has become solid. By means of a tempering treatment at 1,200°, the glass is converted to a partially crystalline condition. This glass, upon vaporizing in an electron beam furnace, as described in Example 1, shows excellent characteristics.

EXAMPLE 6

A batch of the composition:
$SiO_2$ — 7,015 g
$B_2O_3$ (anhydrous) — 1,770 g
$Al_2O_3$ — 400 g
$BaCO_3$ — 1,300 g
$CaCO_3$ — 360 g
$Na_2CO_3$ — 520 g
LiF — 175 g is melted at 1,400° in a platinum crucible in an electrically heated furnace, while in the meantime the furnace is flushed with highly dried air. After the melting, the glass is heated, while being agitated, to 1,600° and for the clarification is left for 3 hours at this temperature. During continuous flushing with dry air, the molten glass is cooled during agitation to 1,400°, then is poured into a mold and cooled as usual until it has become solid. On account of the dissociation occurring, this glass is white-opaque.

The vaporization characteristics of this glass are very good.

The method according to the invention will now be explained in greater detail in an embodiment by way of example, with reference to the single FIGURE of the accompanying drawing, in which a device for performing the method is diagrammatically illustrated.

Within a casing formed by a shell 10 which is evacuated and sealed against the outer atmosphere is arranged a vertically disposed shaft 1, a motor 3, which drives a horizontal shaft 4 which in turn rotates by a bevel gear transmission the vertical shaft 1. The upper end of the vertical shaft 1 has mounted thereon a horizontal carrier 1a upon which is placed a multi-component glass 2 made in accordance with the invention. For the purpose of heating this glass a heater or radiation means 6 is attached to one end of a lever 7 which is pivotally supported in a bearing 8a in the wall of the shell so as to be pivotally movable by the handle 8 arranged outside of the shell to a position above the glass 2 as shown in solid lines. Now the multi-component glass is heated to the desired glowing condition. When this has been done, the heater 6 is pivoted by the handle 8 away from the radiation range of the glass 2 and is arrested in a position shown in dash lines. Now the electron gun 5 is operated so that the glass vaporizes and is deposited on the substrate 9 to be vapor-deposited.

What we claim is:

1. An improved method for producing a layer of a multi-component glass on a substrate comprising the steps of:

A. maintaining a multicomponent glass in a melted condition either under a pressure not greater than about 10 torr or in a protective gas atmosphere for a time sufficient to substantially completely degas said glass, said glass containing not more than about 10 percent by weight of combined alkali oxide, said glass consisting essentially of the following composition:

$SiO_2$ — 35 – 85 percent by weight,
$B_2O_3$ — 5 – 25 percent by weight,
$Li_2O$ — 0 – 5 percent by weight,
$Na_2O$ — 0.5 – 10 percent by weight, $K_2O$ — 0.5 – 10 percent by weight,
$Al_2O_3$ — 3 – 40 percent by weight,
$CaO$ — 0 – 25 percent by weight,
$BaO$ — 0 – 25 percent by weight,
$TiO_2$ — 0 – 20 percent by weight, and
$V_2O_5$ — 0 – 50 percent by weight, B. pouring the so treated glass into a mold,
C. cooling the so treated glass until solid,
D. forming a pane of the so cooled glass,
E. inserting said pane into an electron beam furnace,
F. heating said pane of glass to a glowing condition,
G. bombarding said pane of glass with an electron beam, said beam having an energy sufficient to vaporize progressively glass in said so heated pane,
H. depositing the so vaporized glass as a layer of a desired thickness on a substrate placed adjacent said pane.

2. The process of claim 1 wherein said protective gas atmosphere comprises dry air.

3. The process of claim 1 wherein, in said electron beam furnace, said multicomponent glass having a thermal co-efficient of expansion not greater than about $40 \times 10^{-7}/°C$. in the range from about 20° to 300°C.

* * * * *